United States Patent [19]

Miller et al.

[11] Patent Number: 5,786,883
[45] Date of Patent: Jul. 28, 1998

[54] ANNULAR MASK CONTACT LENSES

[75] Inventors: David Miller, Brookline, Mass.; Leroy Meshel, Ross, Calif.

[73] Assignee: Pilkington Barnes Hind, Inc., Sunnyvale, Calif.

[21] Appl. No.: 120,970

[22] Filed: Sep. 13, 1993

Related U.S. Application Data

[63] Continuation-in-part of Ser. No. 791,121, Nov. 12, 1991, Pat. No. 5,245,367.

[51] Int. Cl.⁶ .................................................. G02C 7/04
[52] U.S. Cl. ..................... 351/162; 351/160 R; 351/161
[58] Field of Search .......................... 351/160 R, 160 H, 351/161, 162, 177; 623/6

[56] References Cited

U.S. PATENT DOCUMENTS

| | | | |
|---|---|---|---|
| 3,339,997 | 9/1967 | Wesley | 351/162 |
| 3,557,261 | 1/1971 | Wichterle | 351/162 X |
| 3,679,504 | 7/1972 | Wichterle et al. | 156/62 |
| 3,794,414 | 2/1974 | Wesley | 351/161 |
| 3,946,982 | 3/1976 | Calkins et al. | 351/177 |
| 4,157,892 | 6/1979 | Tanaka et al. | 8/14 |
| 4,576,453 | 3/1986 | Borowsky | 351/162 |
| 4,582,402 | 4/1986 | Knapp | 351/162 |
| 4,669,834 | 6/1987 | Richter | 351/162 |
| 4,702,574 | 10/1987 | Bawa | 351/162 |
| 4,704,017 | 11/1987 | Knapp | 351/177 |
| 4,720,188 | 1/1988 | Knapp | 351/177 |
| 4,744,647 | 5/1988 | Meshel et al. | 351/177 |
| 4,955,904 | 9/1990 | Atabara et al. | 623/6 |
| 4,994,080 | 2/1991 | Shepard | 351/162 |
| 5,089,024 | 2/1992 | Christie et al. | 351/161 |
| 5,108,169 | 4/1992 | Mandell | 351/161 |
| 5,260,727 | 11/1993 | Oksman et al. | 351/162 |
| 5,414,477 | 5/1995 | Jahnke | 351/162 |

FOREIGN PATENT DOCUMENTS

| | | |
|---|---|---|
| 241830 | 12/1990 | Argentina . |
| 244890 | 11/1991 | Argentina . |
| 0 225098 | 6/1987 | European Pat. Off. . |
| 1115140 | 12/1955 | France . |
| 1400566 | 4/1965 | France . |
| 2599-156-A | 11/1987 | France . |
| 0 484 044 A2 | 5/1992 | Germany . |
| 03-1857 | 1/1991 | Japan . |
| 1276003 | 6/1972 | United Kingdom . |
| WO94/23327 | 10/1994 | WIPO . |

OTHER PUBLICATIONS

Bailey, "Special Contact Lenses and Their Applications", *Optical Journal–Review*, pp. 32–33 (1960).
Bier, "Prescribing for Presbyopia with Contact Lenses" *The Ophthalmic Optician*, 5(9): 439–455 (1965).
Contact Lens Practice, pp. 394–398, 644–646, 655–656.
Girard, "Corneal Contact Lenses" *Textbook* pp. 302–303 (1964).
Groppi, "New Aspects in the Fitting of the Multi–Range Bifocal Contact Lens" *Contacto*, 15(2):22–29 (1971).
Mazow, "The Pupilens—A Preliminary Report" *International Contact Lens Congress in Munich*, Aug. (1958).
Neefe, "Neefe Special Contact Lenses" *Contacto*, Nov. (1975).

(List continued on next page.)

*Primary Examiner*—Scott J. Sugarman
*Attorney, Agent, or Firm*—Burns, Doane, Swecker & Mathis, L.L.P.

[57] ABSTRACT

An annular mask contact lens designed to operate with the normal functioning of the human pupil. An annular mask forms a small pinhole-like aperture on the contact lens enabling continual focus correction. The outer diameter of the annular mask allows the wearer to transmit more light energy through the pupil as brightness levels decrease. The contact lens may be structured with two separate and distinct optical corrections, both at the small aperture region and in the region beyond the annular mask. Functional imaging is thus achieved for both bright and dim lighting, and over a wide range of viewing distances. Cosmetic and peripheral vision enhancement is also provided by the contact lens constructed according to the invention.

44 Claims, 5 Drawing Sheets

OTHER PUBLICATIONS

Rosenbloom, "The Controlled–Pupil Contact Lens in Low Vision Problems" *Journal of the American Optometric Association* 40(8):836–840 (1969).

Wesley, "A New Concept in Successful Bifocal Contact Lens Fitting" 71–73.

Miller, et al., "Perspectives in Refraction", *Survey of Ophthalmology*, 21(4):347–350 (1977).

Vision, pp. 387–390.

Newton K. Wesley, "The Multi–Range Contact Lens", p. 14.

H. Freeman, "A Pinhole Contact Lens", The Optician, Jun. 23, 1950, pp. 623–624.

Alfred A. Fontana, "Coping with the Nystagmoid Albino: Lens Designs that Really Work", Clinical Rounds, Contact Lens, Review of Optometry, Dec., 1979, p. 36.

M.R. Sefcheck, "An Interim Report: Field Studies of Cosmetic Bifocal Contact Lens Patients", pp. 56–58.

Newton K. Wesley, "Research of the Multi–Range Lens", pp. 18–24.

M.R. Sefcheck, "Latest Cosmetic Bifocal Fitting Technique", pp. 52–53.

Ellen Takahashi, "The Use and Interpretation of the Pinhole Test", Optometric Weekly, vol. 56, No. 18, May 6, 1965, pp. 83–86.

ANNULAR MASK CONTACT LENSES

REFERENCE TO RELATED APPLICATION

This application is a continuation-in-part of the commonly-owned U.S. patent application Ser. No. 791,121 filed on Nov. 12, 1991 now U.S. Pat No. 5,245,367.

BACKGROUND OF THE INVENTION

This invention concerns a contact lens for vision correction and, in particular, annular mask contact lenses and related methodology.

Contact lenses are commonplace today. Most individuals with average refractive errors can quickly and easily acquire and use these lenses in place of prescription eye glasses. This is not true, however, for individuals who are presbyopic, i.e., those requiring multi-focal visual correction, or for those individuals with structural eye abnormalities. These individuals are left with little choice in selecting comfortable, effective contact lenses. Lenses which are available typically encumber these wearers with other difficulties, and are usually very expensive. Presbyopic individuals, for example, who choose to wear soft contact lenses are usually fitted in a "monovision" mode, where one eye is corrected for near vision, and the other eye is corrected for far vision. Further, the commercially available soft multifocal contact lenses are effective only for early presbyops, and are difficult to fit and to produce consistently.

The long felt need to develop more versatile multifocal lenses has led designers to pinhole contact lenses. These lenses endeavor to utilize the known theories of pinhole imaging, commonly understood in optics as a method to reduce geometrical aberrations, e.g., astigmatism, spherical aberration, and coma. By restricting a person's vision to a small "pinhole" aperture, visual deficiencies can be reduced or effectively removed. Unfortunately, the utility of this technology has been diluted because of designs and approaches inappropriate for effective corrective refractive prescriptions. For upwards of 50 years, pinhole contact lenses have been under consideration, yet they remain today commercially unsuccessful and largely unavailable. As a result, wearers afflicted with relatively poor vision are typically unaided by contact lenses.

"Multiple Focal Contact Lenses", as described in U.S. Pat. No. 3,794,414, was one attempt to develop small-aperture contact lenses. This approach combined a pinhole-like aperture with radial slits and scalloped masking regions on a contact lens supposedly to correct both peripheral vision and the effects related to decentered contact lenses. The contact lenses were made from a rigid substrate, and "floated" on the eye, creating a need for apertures over a large portion of the lens. The disclosed designs though, i.e., the use of scalloped patterns and radial slits, actually encourage diffraction effects at the retina. This reduces image quality. The nature of small-aperture correction is to correct geometrical aberrations in excess of diffraction. Therefore, the benefits achieved according to that patent by incorporating the small, pinhole-like, aperture, are likely to be offset by undesirable diffraction effects.

In addition, the teachings in the aforementioned patent do not generally consider the normal functioning of the human pupil. One significant drawback in pinhole imaging is energy starvation. Small-aperture lenses improve image quality, but at the same time block significant amounts of light energy from reaching the retina. Under dim lighting conditions, a human pupil normally dilates. Without proper consideration, a small-aperture contact would equivalently place a person into darkness, even though the lighting is only dim or low.

Pinhole correction together with the normal functioning of the human pupil is considered in U.S. Pat. No. 4,955,904, which presents an intraocular lens surgically implanted within the eye. The patent, entitled "Masked Intraocular Lens and Method for Treating a Wearer With Cataracts", affords cataract wearers some form of vision correction through surgery. The intraocular lens is masked to form a pinhole that accommodates the function of the human pupil under different lighting conditions. But, intraocular lenses have operational and other drawbacks. They are not contact lenses; surgery is required and the lens must be permanently implanted with precision, typically through the use of man-made loops. Furthermore, because of material requirements for implantation, these impenetrable lenses can transmit little or no oxygen, a feature widely available in contact lenses. Contact lenses, in addition, are conveniently installed and removed by the wearer, and are held in place on the eye through tear and lid tension.

With this background, an object of this invention is to provide an improved small-aperture contact lens, and in particular, one which accommodates the normal function of the human pupil.

Another object of this invention is to present a contact lens which provides functional imaging during both bright and dim lighting conditions, and over a wide range of viewing distances.

Yet another object of this invention is to provide a small-aperture contact lens and related methodology to reduce the appearance of pinhole contact lenses on the eye of the wearer.

Other objects of the invention are evident in the description that follows.

SUMMARY OF THE INVENTION

The present invention provides, in one aspect, improvements to a contact lens that has a transparent lens body. The lens body has a first surface configured, for the most part, to conform to the eye curvature of the wearer. A second surface, opposite to the first surface, is optically configured, in relation to the first surface, to correct the vision of the wearer for a focus between near and far objects. The lens body has a mask that forms an annulus pattern with a small, so-called pinhole aperture. The annular mask is arranged to accommodate the pupil of the wearer over different viewing distances and differing brightness levels. Thus, during average light conditions, the annular mask reduces the light energy through the pupil of the wearer; and in dimmer light conditions, the annular mask permits relatively more light energy to pass through dilated pupil of the wearer to reach the retina. In a preferred aspect, the annular mask is sized such that, during dim lighting conditions, the wearer's dilated pupil is larger than the denser section of the annular mask and substantially unrestricted light energy passes outside the annular mask region and through the wearer's pupil.

In another aspect according to the invention, the second surface of the contact lens has an optical configuration outside the annular mask region which corrects the vision of the wearer selectively at a focus between and including near and far objects. Thus, the second surface forms a multi-powered surface: within the annular mask, the second surface corrects the wearer's vision selectively at a first distance; and outside the annular mask, the second surface corrects the wearer's vision selectively at a second distance. Preferably, the first distance is an intermediate one, between near and far objects; and the second distance is at far objects.

In other aspects, the first and/or second surface of a contact lens constructed according to the invention includes an optical correction. For example, the first and/or second surfaces has an aspheric, concave, or toric form to correct certain deficiencies in the vision of the wearer. The second surface can additionally have a convex form as an optical correction.

In yet other aspects according to the invention, the lens body is made with oxygen permeable material, or with flexible polymer material to form a rigid or soft contact lens.

A contact lens constructed in accordance with the invention has further aspects relating to physical dimensions. For example, in one aspect, the lens body has an outer diameter of between approximately seven and eighteen millimeters. In another aspect, the pinhole aperture has a diameter of between approximately one-half and three millimeters. In another aspect, the annular mask region forms an annulus with a radial width of between approximately one-half and four millimeters. Preferably, however, the annular mask region has a total diameter of approximately four and one-half millimeters.

In yet another aspect, a contact lens constructed according to the invention has a lens body which is selectively colored or tinted. This coloring can be employed for cosmetic reasons, as well as to improve the function of the annular mask.

The annular mask region is selectively patterned, colored or tinted, in another aspect, to further reduce the appearance of the annular mask region when viewed on the wearer. For example, one patterned annular mask according to the invention is feathered along its outer circumference or border, such that the edge contrast of the annular mask is degraded. In a preferred aspect, the annular mask region is selectively colored or tinted to match, enhance, or otherwise change the appearance of the iris color of the wearer. This too can be for cosmetic reasons; and additionally it can reduce or modify the appearance of the annulus when viewed on the wearer's eye.

In still another aspect, a contact lens constructed according to the invention has an annular mask with an optical transmissivity in the visible electromagnetic spectrum between approximately zero and ninety percent. In one preferred aspect, the chosen transmissivity is achieved through a plurality of light-blocking dots, arranged for selectively reducing the transmission of light energy through the annular mask region by between approximately ten and one hundred percent. In another aspect, the annular mask region is selectively translucent, thereby reducing and diffusing light to the wearer's pupil. In most practical applications, the amount of transmissivity through the annular mask is relatively small, typically less than twenty percent.

A contact lens constructed in accordance with the invention is preferably shaped or weighted to restrict the motion of the lens body relative to the eye of the wearer to less than approximately one and one-half millimeter. For example, and in one aspect, a prism ballast weight with the lens body reduces unwanted motion of the lens on the eye. In still another aspect, weighting or shaping of the lens body centers the pinhole aperture created by the annular mask at the optimal position on the eye of the wearer.

In still another aspect in accordance with the invention, the annular mask region has at least one transmissive artifact that is free from obscuration, such as the obscuration forming the selectively transmissive annular mask region. The transmissive artifact thus represents an area that transmits light energy through the lens body with a transmission similar to the transmission of light energy through the pinhole aperture. Preferably, the transmissive artifact has a geometrical optical arrangement that improves the peripheral vision of the wearer. The artifact has a shape and size which does not create unwanted diffraction effects. For example, one acceptable transmissive artifact pattern is created by three slits arranged in 60° arcs about the annulus.

The invention provides, in another aspect, methodology to manufacture a contact lens, including the steps of: (1) forming a contact lens body with a first surface configured to conform to the eye curvature of a wearer and with a second surface configured to correct the vision of the wearer selectively at a focus between and including near and far objects; and (2) providing an annular mask region of selected optical transmissivity with the lens body. According to this aspect, the annular mask region forms a substantially pinhole-like aperture which transmits light energy through the pupil of the wearer. The annular mask region further reduces light energy through the pupil of the wearer during average lighting conditions, while permitting more light energy to pass through the pupil of the wearer during lower lighting conditions as the pupil dilates.

In a preferred aspect, the method includes the further step of providing an optical correction outside the annular mask region to correct the vision of the wearer selectively at a focus between and including near and far objects, thus forming a multi-powered second surface.

In yet other aspects, the method includes the step of providing an optical correction, such as with an aspheric, toric, convex or concave form, on the second surface of the lens body. Alternatively, or additionally, the method includes the step of providing an optical correction, such as with an aspheric, toric or concave form, on the first surface.

In yet other aspect, the method includes the further step of optimizing the size of the annular mask region to fit the particular pupil size of the wearer. In still another aspect, additional mask is provided to selectively block portions of the wearer's pupil that contribute undesirable image effects, such as created by those portions of the eye that are damaged or scarred.

A method according to the invention includes, in still other aspects, the step of weighting or shaping the lens body to maintain a particular orientation on the eye of the wearer. The lens body can also be weighted or shaped to center the aperture at the pupil of the wearer. In a preferred aspect, a method for manufacturing a contact lens in accordance with the invention includes the step of configuring the lens body, e.g., with a weight such as a prism ballast or with shaping of the lens body, such that the lens body is restricted for movement of less than approximately one and one-half millimeters relative to the eye of the wearer.

In other aspects, a method according to the invention includes alternative or additional steps for forming the annular mask region. For example, in one aspect the annular mask is formed by providing light-blocking areas with or within the lens body that are arranged to reduce the transmission of light energy selectively through the annular mask region by between approximately ten and one hundred percent. In one practice according to the invention, transmission through the annular mask is reduced by disrupting the refractive power of the lens in the area of the annular mask by laser or chemical etching, or by physical abrasives. In a related aspect, the annular mask is formed by providing variably transmissive coatings with the lens body such that light energy is selectively transmitted through the annular mask region by between approximately zero and ninety percent. Typically, however, the transmission through the annular mask is less than twenty percent. Alternatively, and in another aspect, a light-restricting element is employed within the lens body to form the annular mask region.

One aspect of the invention includes the step of forming light transmitting artifacts within the annular mask region. These transmitting artifacts represent areas that transmit light energy through the lens body with a transmission similar to that of the aperture. Accordingly, these transmitting artifacts are not optically opaque, but rather freely transmit light energy through the wearer's pupil, much like the aperture does. The transmitting artifacts are preferably arranged in a geometrical optics configuration to improve the peripheral vision of the wearer. They are also arranged to reduce unwanted diffraction effects caused by the artifacts at the retina.

In a preferred aspect, a method according to the invention includes the further step of patterning, coloring, or tinting the annular mask region to reduce the appearance of the annular mask when viewed on the eye of the wearer. Feathering techniques, for example, create acceptable patterns which tend to reduce the annular mask appearance.

In still another aspect, the invention provides for a non-surgical method for treating wearers with visual aberrations, including the steps of: (1) fitting at least one eye of a wearer with a first contact lens configured to correct the vision of a wearer at a focus between and including near and far objects; and (2) providing an annular mask region of selected optical transmissivity to the contact lens. In this method, the annular mask region is arranged to form a substantially pinhole-like aperture for the pupil of the wearer. The annular mask region substantially obscures the pupil of the wearer during average lighting conditions except for the small aperture, while permitting more light energy to pass through the pupil of the wearer during lower lighting conditions, such as when the pupil dilates.

A non-surgical method as described above can include the additional steps of (1) fitting only one eye of the wearer with the first contact lens and (2) fitting the other eye with a different contact lens, e.g., one of selected power, and one that is substantially free of an annular mask region.

The advantages of a contact lens constructed in accordance with the invention are several. The lens improves a wearer's vision over a wide range of viewing distances. The lens improves a wearer's vision during differing brightness conditions by incorporating the normal function of the human pupil in the size of the annular mask. Moreover, complex vision correction is possible with the invention by providing a multi-powered contact lens. If a wearer has an area on the iris which is damaged or surgically removed, these portions can be selectively blocked, according to the invention, for further vision improvement. A contact lens according to the invention does not encourage diffraction effects, thereby avoiding a reduction in visual acuity. A contact lens according to the invention also achieves an acceptable cosmetic appearance, unlike known pinhole contact lenses; in particular, with the lens of the invention, the annular mask has a reduced appearance when viewed on the eye of the wearer.

These and other aspects and features of the invention will be more fully understood in the detailed description which follows.

BRIEF DESCRIPTION OF THE DRAWINGS

For a fuller understanding of the nature and objects of the invention, reference should be made to the following detailed description and the accompanying drawings, in which.

DESCRIPTION OF ILLUSTRATED EMBODIMENTS

Figure 1:
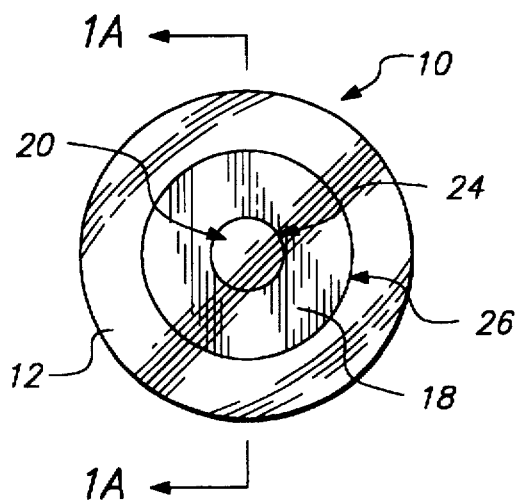
FIG. 1 is a plan view of an annular mask contact lens constructed in accordance with the invention.
Figure 1A:
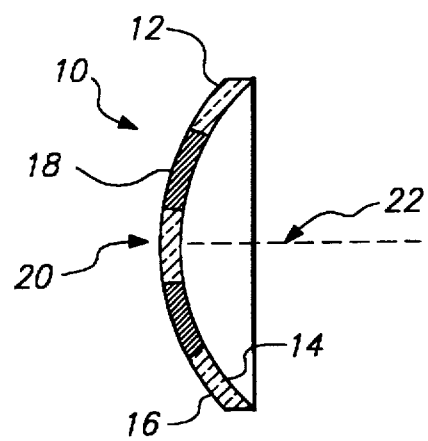
FIG. 1A is a diametrical sectional view of the lens of FIG. 1.

FIGS. 1 and 1A show a contact lens 10 constructed in accordance with the invention: FIG. 1 shows the contact lens 10 in a front view; while FIG. 1A shows the contact lens 10 in a side sectional view. The contact lens 10 has a transparent lens body 12 that is manufactured by known techniques and methods in the art.

In accordance with the improvements of the invention, the lens body 12 has a first surface 14 optically configured, e.g., with a concave form, to conform to the eye curvature of the wearer. The lens body 12 has a second surface 16 optically configured, e.g., with a convex form, to correct the vision of the wearer selectively at a focus between and including far and near objects. Focusing is achieved both by the contact lens 10 and by the refractive capability of the wearer's eye.

The contact lens 10 has an annular mask 18 that is selectively transmissive according to the particular needs of the wearer. In a preferred embodiment, the annular mask 18 is opaque such that it blocks light energy at the lens body 12. The annular mask 18 is further arranged to form a substantially pinhole-like aperture 20 at the wearer's optical line-of-sight 22, which is approximately at the center of the lens body 12. The aperture 20 is preferably arranged to be concentric with the wearer's pupil, which could be off-center with respect to the curvature of the cornea.

Constructed in this fashion, the contact lens 10 operates as a pinhole imager and increases the depth of focus for objects viewed by the wearer. Light rays from a single object in the field of view, and entering the pinhole aperture 20, are more tightly imaged at the retina than in the absence of the lens 10. This reduces the blurring at the retinal image and increases the wearer w visual acuity. Normally, the typical geometrical vision deficiencies encountered in wearers, like myopia, hyperopia, astigmatism, and presbyopia, spread out the light rays reaching the retina from a single object point in the field of view, thereby reducing image contrast. The pinhole aperture 20 limits these light rays to a small bundle entering the eye pupil, and thereby improves image contrast. Visual acuity is also improved over a large range of viewing distances because defocus effects are less noticeable with the reduced blurring of the image at the retina.

The pinhole aperture 20 is sized to provide pinhole imaging improvement for the wearer's vision deficiency. The aperture 20 is smaller than the wearer's pupil size during average lighting conditions to improve vision clarity during such conditions. Preferably, however, the aperture 20 is smaller—or approximately equivalent to—the pupil of the wearer during bright light conditions. With this latter sizing, the wearer has improved vision clarity even during bright lighting conditions.

Thus the aperture 20 is less than approximately four millimeters, to accommodate the variety of pupil diameters under average lighting conditions. Since the contact lens may not always center over the wearer's pupil, the lens 10 is preferably fitted first, and the position of the annulus 18 noted, and the lens 10 then made to special order according to the fitting so the annulus 18 centers over the wearer's pupil. In a preferred embodiment, the lens body 12 is weighted, e.g., with a prism ballast 17 in FIG. 1B, or shaped to center the aperture 20 at the optimal location on the eye of the wearer, and to reduce the movement of the contact 10 on the wearer's eye, preferably to less than approximately one and one-half millimeters. Accordingly, the lens 10 is held in a relatively constant position on the eye of the wearer, thereby maximizing the lens 10 for central vision while reducing the possibility of a reduction in the peripheral field by decentering and other excessive movements.

At the same time, the pinhole aperture 20 desirably is greater than the diameter at which diffraction effects start to degrade image quality. In general, the benefits achieved by the pinhole aperture 20 can be destroyed by diffraction if very small apertures are incorporated into the pinhole contacts lenses. Such small apertures that have these adverse results include radial slits and scalloped patterns. Diffraction can actually increase the blurring of the retinal image such that the wearer's vision is degraded rather than improved. Thus, to avoid unacceptable diffraction effects, the lower limit of a pinhole aperture in a usable contact lens is approximately one-half millimeter.

Therefore, the diameter of the pinhole aperture 20 is generally greater than one-half millimeter and less than four millimeters. In a preferred embodiment, the pinhole aperture 20 is approximately two millimeters in diameter.

In addition, the radial width of the annular mask 18, from the inside edge 24 to the outside edge 26, is preferably between approximately one-half and four millimeters. This dimension is sized in the practice of the invention to accommodate the normal function of the human pupil, as described below. Typically, the annular mask 18 has a diameter of approximately four and one-half millimeters.

The lens body 12 can be constructed with material to form a hard, gas permeable lens, or, alternatively, to form a soft contact lens, e.g., with a flexible soft polymer material. Combinations of these materials are also suitable to form a composite contact. The outer diameter of the lens body 12 is approximately seven to eighteen millimeters, depending upon the wearer's eye size.

It can be appreciated that the dimensions of the annular mask 18 can be adjusted for a particular wearer. For example, the annular mask 18 can be sized for a particular pupil, or further optimized for a desired visual correction.

For ease of manufacture, the second surface 16 is appropriately configured and powered to correct the vision of the wearer for distant objects. In a preferred embodiment, however, the second surface 16 is configured within the annular mask 18, i.e., at the pinhole aperture 20, to correct the wearer's vision at an intermediate focus, approximately midway between near and far objects. According to this embodiment, the lens 20 is multi-powered: the lens body 10 corrects the wearer's vision for far objects outside the annular mask 18, and corrects for intermediate objects within the pinhole aperture area.

It should be apparent to those skilled in the art that other multi-powered corrections are possible without departing from the scope of the invention.

The contact lens 10 typically corrects the wearer's vision by forming an optical correction on the second surface 16. Common corrections include convex, concave, toric, and astigmatic forms. Alternatively, or in conjunction with the an optical correction on the second surface, the first surface can similarly include an optical correction, such as with a toric, astigmatic, or concave form.

Figure 2A:
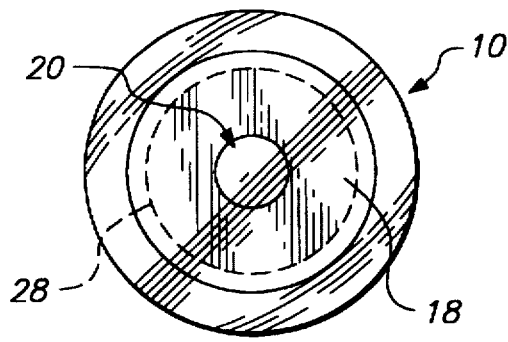
FIG. 2A is a diametrical sectional view of the lens of FIG. 2.
Figure 2:
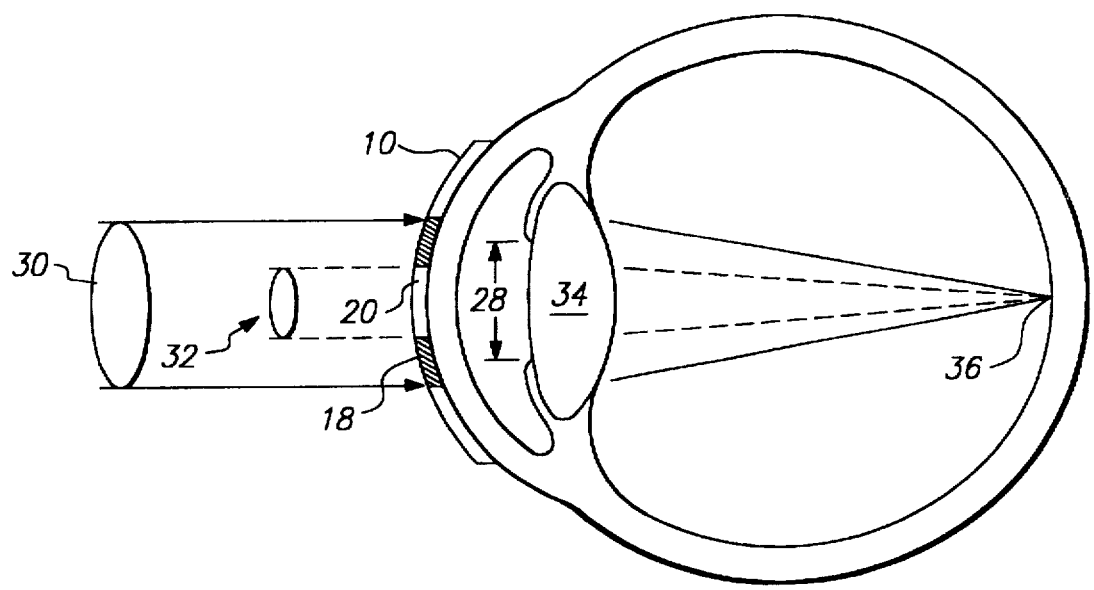
FIG. 2 illustrates an annular mask contact lens according to FIG. 1 and its relation to the human pupil during average light conditions.

FIGS. 2 and 2A illustrate the relationship of the annular mask contact lens 10 of FIGS. 1 and 1A to the wearer's contracted pupil 28 during average conditions. Light rays 30 show the bundle of light from a far object point which passes through the wearer's pupil 28 without the contact lens 10. Light rays 32 show the smaller bundle of light from the same object point which passes through the wearer's pupil with the contact lens 10. Light rays 32 pass by the edge of the pinhole aperture 20 and do not pass by the edge of the human pupil 28. The light rays 32 are focused by the contact lens 10 and by the eye's refractive portions 34.

Under normal viewing, without the contact lens 10, the wearer's retina 36 would receive all the light energy from the light rays 30. The light rays 30 would pass by the edge of the eye pupil 28 and eventually reach the retina 36, where the light energy is converted into signals perceived by the brain.

However, while viewing through the contact lens 10 under average light, or daylight, conditions, the pinhole aperture 20 created by the annular mask 18 restricts the effective light transmitting aperture so that only the light rays 32 pass through the eye pupil 28 and to the retina 36. Because the light rays 32 constitute a smaller geometrical extent upon the eye's refractive portions 34, as compared to the light rays 30, the aberrations and/or defocussing effects at the retina 36 are reduced.

FIG. 2A shows that the functional size of the eye pupil 28 is optically larger than the effective diameter created by the pinhole aperture 20 of the contact lens 10 under average light conditions. The light rays entering the eye through the pinhole aperture 20 are restricted to a smaller geometrical extent, as compared to the light rays which would otherwise pass through the eye pupil 28. The smaller bundle of light passing through the pinhole aperture 20 is thus more tightly focused at the retina, thereby improving the clarity of objects viewed by the wearer.

In contrast to FIGS. 2 and 2A, FIGS. 3 and 3A show one embodiment of a contact lens 11, similar to the contact lens 10 of FIGS. 1–2, constructed in accordance with the invention whereby the outer diameter of the annulus 19 is sized to accommodate a wearer's dilated pupil 28 during lower light conditions. The bundle of light rays 38 from the same object point strikes the contact lens 11 in the regions 40, 42, and 44, and are focused at the retina 36 by the contact lens 11 and the eye's refractive portions 34. The eye pupil 28 is illustratively shown as the wearer's limiting aperture under normal viewing without the contact lens 11, where the wearer would receive light energy from all the light rays 38. The light rays 38 would pass through the edge of the pupil 28 and eventually reach the retina 36. Because of the dimmer lighting, the wearer's pupil 28 has dilated from its size shown in FIGS. 2 and 2A to acquire more light energy at the retina 36. The widely dilated pupil occurs most readily under dim illumination when a person's attention is primarily drawn to distant objects.

Figure 3A:
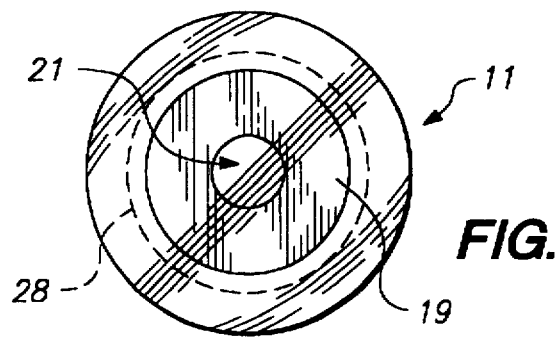
FIG. 3A is a diametrical sectional view of the lens of FIG. 3.

The annular mask 19 of the contact lens 11 is sized to increase the available transmission through the pupil 28 and to the retina 32 under dimmer lighting, as compared to average light conditions shown in FIG. 2. As seen in FIG. 3A, the pupil 28 is optically larger than the effective diameter of the annular mask 19 after the wearer's pupil dilates. During lower light conditions, the wearer can thus receive light rays 38 at the retina 36 through the transmitting regions 40 and 42. The energy passing through the region 40 is transmitted through the pinhole 21, and to the retina 36. The light energy passing through the region 42 is transmitted outside the annular mask 19 and to the retina 36. Some of the light rays 38 are blocked at the region 44 by the annular mask 19.

Accordingly, the contact lens 11 increasingly transmits more of the light rays 38 as the wearer's pupil size increases or dilates. The wearer is, therefore, better able to discern the same objects which were viewed under brighter conditions.

Figure 3:
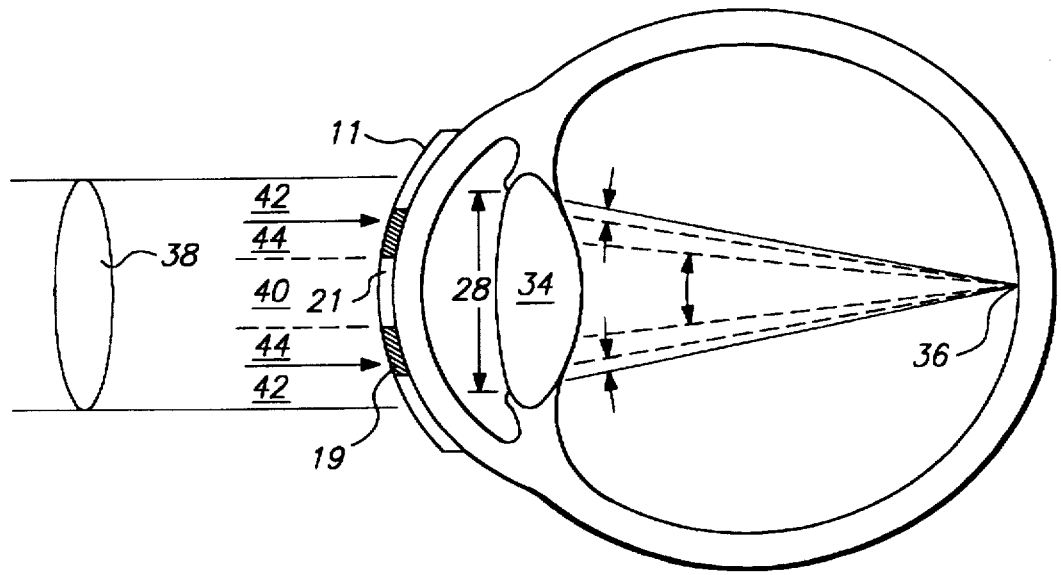
FIG. 3 illustrates an annular mask contact lens constructed according to the invention and its relation to the human pupil where the annulus is smaller than the wearer's dilated pupil under dim lighting conditions.

Alternatively to, or in conjunction with, the contact lens 11 illustrated in FIGS. 3 and 3A, the annular mask 18 (FIGS. 1–2) or 19 (FIG. 3–3A) is variably and selectively transmissive to provide more light energy to the retina as the wearer's pupil dilates.

Whether in the form of a coating or other structure, the mask region 18 (FIG. 1) and 19 (FIG. 3) can have various selected levels of transmissivity. To take full advantage of the versatility in vision correction available in a pinhole contact lens according to the invention, the annular mask region is variably transmissive through the lens body to between approximately zero and 90% in the visible light spectrum. Opacity is generally desired for maximal visual sharpness. However, a person may want a to transmit more light energy through the annulus to avoid a sense of visual dimness, i.e. to attain more brightness. Typically, an annulus transmission of less than approximately twenty percent is sufficient for this purpose. The optical transmissivity of a mask region according to the invention can therefore vary from lens to lens, as well as within a lens, to attain vision having a selected balance of factors. For example, in one practice according to the invention, the annular mask transmits less light energy towards the pinhole aperture, and transmits relatively more light energy towards the outer edge of the contact.

Those skilled in the art will appreciate that the mask regions of the lenses 10 and 11 in FIGS. 1–3 can be constructed in several ways. One practice for achieving this transmissivity utilizes a light-blocking element 37, shown in FIG. 1C, configured with the body to restrict light passage through the lens body. Another practice uses a variably transmissive coating applied to, or manufactured with, the lens body. Yet another practice generates the annular mask with a plurality of light-blocking dots, which in total reduce the transmission of light energy through the annulus to the selected transmissivity, for example by between approximately ten and one hundred percent. Typically, however, the light-blocking dots restrict over eighty percent of the light energy transmitted through the annular mask.

Still other practices for forming the annular mask region include Diazo contact printing, mesoprints, and reactive and VAT dyes. Other practices for forming the annular mask include a variety of methods for disrupting the surface or refractive properties of the lens in the area of the annular mask. For example, lasers or chemical etchants, or physical abrasives, are effectively used to disrupt the optical surface of the contact to change the transmission in the annular mask region to form the annular mask. Suitable techniques for disrupting and creating such optical surfaces are described in U.S. Pat. No. 4,744,647, entitled "Semi-Opaque Corneal Contact Lens or Inraoccular Lens and Method of Formation", which is accordingly incorporated herein by reference.

A particularly advantageous practice for achieving the variably transmissive annular mask utilizes PAD FLEX, or Italio Plate methodology, which is well-known to those skilled in the art. In PAD FLEX printing, for example, a silicone tip contacts an Italio plate engraved with a selectable pattern and covered with ink. The tip acquires the image from the Italio plate and then transfers the image without distortion onto a wide range of curved surfaces, such as a contact lens.

Accordingly, a contact lens 10 (FIGS. 1–2) constructed with a transmissive annulus 18, rather than a light-blocking annulus, may be sized with a diameter greater than the annulus 19 of FIG. 3. Since light energy is transmitted throughout the annulus 18, more light energy is transmitted through the pupil 28 as the pupil dilates. Therefore, there is no requirement that the pupil 28 exceed the annulus diameter, such as illustrated in FIGS. 3–3A. However, the annulus 19 of FIGS. 3–3A is appropriately transmissive in some instances to further increase the light energy to the retina.

The size of the annular masks 18 and 19, FIGS. 2 and 3, provides certain advantages, particularly with respect to the pinhole aperture. For example, during eye examinations, a doctor can pharmacologically dilate the pupil of a person wearing the contact lens, and examine the entire retina, up to the periphery. This generally cannot be done through a normal pupil that is approximately two millimeters or less in diameter.

A contact lens constructed in accordance with the invention, such as the lens 10 of FIGS. 1–2, is colored, tinted, or otherwise shaded, when appropriate, by methods known in the art. This coloring or tinting can be cosmetic, as it often is for many wearers of common contact lenses. It can also reduce the sometimes objectionable appearance of the annular mask 18 when viewed on the eye of the wearer. For example, the invention provides for an annulus that is matched to the wearer's iris. It also provides for an annulus that enhances or changes the appearance of the wearer's iris, if desired.

Figure 4:
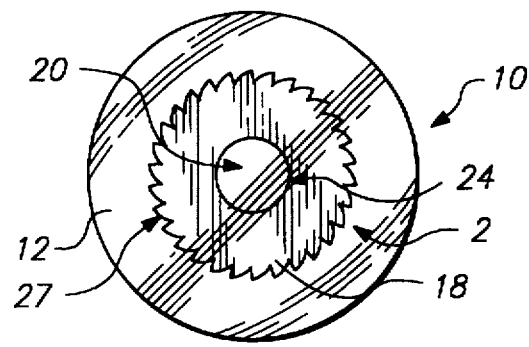
FIG. 4 shows the contact lens of FIG. 1 with a feathered annulus.

In one preferred embodiment, the annular mask 18 is patterned to reduce the visual contrast of the borders or edges of the annular mask 18. FIG. 4 shows the contact lens 10 of FIG. 1 with an outer edge 27, which is feathered to reduce the contrast of the edge 27 as compared to the edge 26 of FIG. 1. Other annulus patterns are possible, as long as the overall visual effect or appearance of the annulus 18 is reduced when viewed on the eye the wearer.

Figure 5:
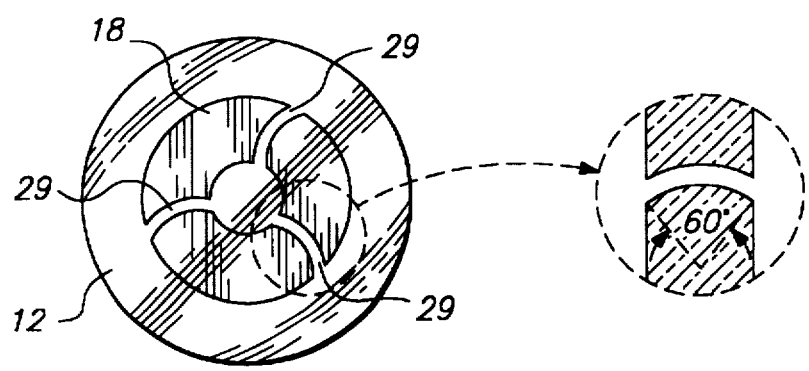
FIG. 5 shows the contact lens of FIG. 1 with light-transmitting artifacts.

The feathered edge 27 illustrates one example of a transmissive artifact that may form part of the annular mask 18 in accordance with the invention. Such a transmissive artifact represents an area with the annular mask region that is free of the light restricting matter, e.g., a light-blocking element or a variably transmissive coating, which can form the annular mask 18. Another transmissive artifact is illustrated in FIG. 5, showing the contact lens 10 of FIG. 1 with a plurality of curved, arc-like transmissive artifacts 29. Preferably, these artifacts 29 are arranged in a geometrical optical configuration, such as shown in FIG. 5, to improve the peripheral vision of the wearer, if needed. However, these artifacts 29 are to be carefully sized and shaped to alleviate undesirable diffraction effects which may be caused by the artifacts. One acceptable artifact shape is illustrated in FIG. 5, whereby the diffraction pattern created by the artifacts 29 is spread out equally over the retina. The illustrated artifacts 29 have 60° arcs, relative to their radii of curvature, as illustrated in FIG. 5, which diffract light to the retina in a pattern much like opposed 60° pie slices. Each respective artifact fills in the diffractive pattern, completing 360° at the retina.

Figure 6:
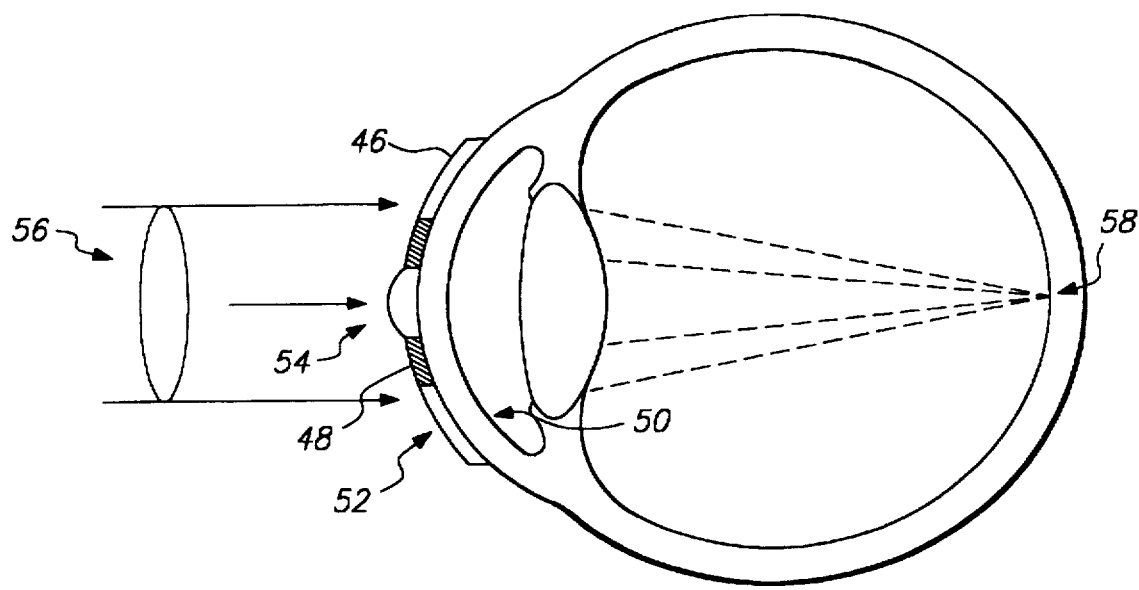
FIG. 6 illustrates a bi-powered annular mask contact lens constructed in accordance with further features of the invention.

FIG. 6 shows a preferred practice of the invention incorporating a bi-powered contact lens 46. The annular mask 48 and the first surface 50 of the lens 46 are arranged as described above with reference to FIGS. 1 and 1A. The structure of the second surface 52 of the contact lens 46 forms two regions that provide two distinct optical corrections. In the region defined by the pinhole aperture 54, the second surface 52 is optically configured to correct the wearer's vision for in intermediate distance, between near and far objects. In addition, the second surface 52 in the region outside the annular mask 48 is optically configured to correct the wearer's vision for far objects.

As shown in FIG. 6, the light rays 56 which pass through the contact lens 46 enter both the pinhole aperture 54 and the region outside the annular mask 48 during lower lighting conditions, i.e., when the pupil 28 of FIG. 2 is dilated. However, all of the light rays 56, which originate from the same object point, effectively focus at the retina, illustratively shown as 58, even with the differing optical corrections forming surface 52. The light rays 56 which enter the pinhole aperture region 54 are subjected to greater refracting power at surface 52 yet still in focus at the retina 58 because of the large depth of focus created by the annulus 48. The light rays 56 which pass outside the annular mask 48 are subjected to relatively less refractive power at surface 52 but also focus at the retina.

Therefore, under average lighting conditions, the pupil 28 of FIG. 2 is somewhat contracted, and the light rays 56 enter only through the pinhole aperture 54, focusing at a point between near and far vision. In dim lighting conditions, the pupil 28 of FIG. 3 is dilated, and the light rays 56 are focused both intermediately within the pinhole 54 and at far objects outside the mask 48.

The bi-powered nature of the contact lens 46, together with the annular mask 48, enables the wearer to view both far and near objects under the differing light intensities. The intermediate optical power inside the annular mask 48 and the pinhole aperture 54 provide for the large depth of field.

Figure 7:
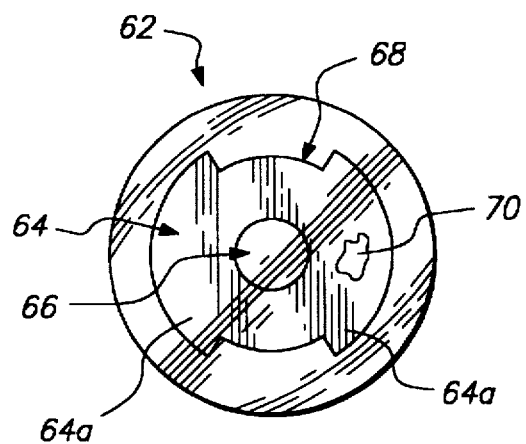
FIG. 7 illustrates an annular mask contact lens constructed in accordance with further features of the invention and which selectively blocks portions of the human pupil.

FIG. 7 shows another contact lens 62 according to the invention and which incorporates selective blocking by a mask 64. A pinhole aperture 66 and the annular mask diameter 68 are formed by the mask 64 as described above with reference to FIGS. 1, 2 and 2A. The mask 64 is, in addition, selectively applied to regions 64a outside the annulus outer diameter 68 to block light energy striking highly irregular portions 70 of the iris which may contribute undesirable image effects. The two illustrated regions 64a are annular portions contiguous with the mask region within the diameter 68. For example, a damaged iris, or iris regions removed in surgery, would be candidates for selective blocking by a mask region 64a, thereby reducing the negative visual image effects relative to those areas 70.

Figure 1B:
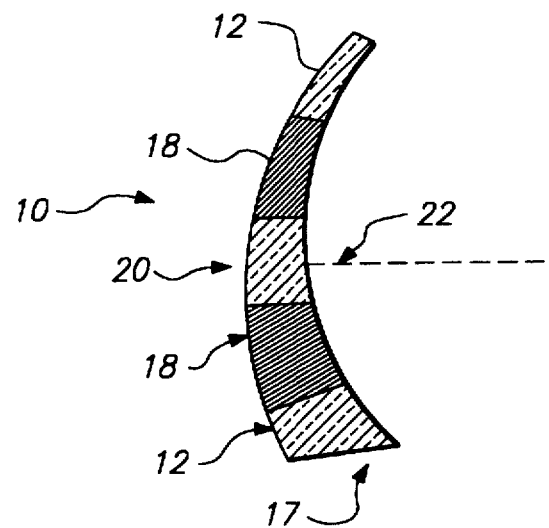
FIG. 1B is a diametrical sectional view of the lens of FIG. 1 with a prism ballast.
Figure 1C:
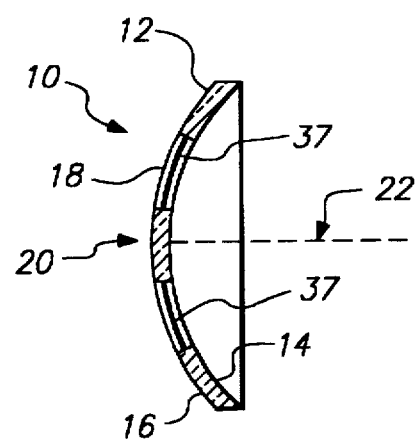
FIG. 1C is a diametrical sectional view of the lens of FIG. 1 with an internal light-blocking element forming the annular mask.

Because the mask 64, including regions such as 64a, can be non-symmetric, the contact lens 62 can be weighted, such as with a prism ballast of FIG. 1B, to maintain a particular orientation on the wearer's eye.

It is thus seen that the invention efficiently attains the objects set forth above, among those apparent in the preceding description. In particular, the invention provides an annular mask contact lens capable of correcting human vision under differing lighting conditions and viewing distances.

It will be understood that changes may be made in the above constructions without departing from the scope of the invention. For example, the arrangement and size of the annular mask 18, as shown in FIGS. 1 and 1A, can be selected for a particular wearer to optimize the visual correction available in the pinhole contact lens 10. In another example, the contact lens body 12 can be constructed with a yellow appearance, giving the wearer a physiological impression of brighter lighting. In a further example, the contact lens 10, 11, 46, and 62 in FIGS. 1–7, can be constructed with materials, or combinations of materials, forming a soft, gas permeable, hard and semi-hard contact lens. Those skilled in the art will appreciate that the invention can also aid wearers suffering from other vision deficiencies and disorders.

It is accordingly intended that all matters contained in the above description or shown in the accompanying drawings be interpreted as illustrative rather than in a limiting way.

It is also to be understood that the following claims are intended to claim all of the specific and generic features of the invention as described herein, and all the statements of the scope of the invention which fall therebetween.

What is claimed is:

1. A contact lens which comprises:
   a lens body having a first surface substantially configured to conform to the eye curvature of the wearer,
   said lens body having a second surface optically configured, in conjunction with said first surface, to correct the vision of the wearer selectively at a focus between and including far and near objects, and
   said lens body having an annular mask region of selected optical transmissivity and arranged for
   (i) forming a substantially pinhole-like optical aperture which transmits light energy through the pupil of the wearer,
   (ii) centering said annular mask region over the pupil of the wearer, and
   (iii) permitting increasing light energy to pass through said lens body as the pupil of the wearer dilates during lower lighting conditions
   wherein optical transmissivity of the the annular mask region varies such that the annular mask region transmits less light energy toward the pinhole aperture and transmits more light energy toward the outer edge of the contact lens.

2. A contact lens according to claim 1 wherein said second surface has an optical configuration outside said annular mask region which corrects the vision of the wearer selectively at a focus between and including near and far objects, said second surface thereby forming a multi-powered surface.

3. A contact lens according to claim 1 wherein said second surface has an optical correction, such as an aspheric, convex, concave, or toric correction, for correcting the vision of the wearer.

4. A contact lens according to claim 1 wherein said first surface has an optical correction, such as an aspheric or toric correction, for correcting the vision of the wearer.

5. A contact lens according to claim 1 wherein said lens body consists essentially of oxygen permeable material.

6. A contact lens according to claim 1 wherein said lens body consists essentially of flexible polymer material forming a soft contact lens.

7. A contact lens according to claim 1 wherein said lens body has an outer diameter of between approximately seven and eighteen millimeters.

8. A contact lens according to claim 1 wherein said pinhole aperture has a diameter of between approximately one-half and three millimeters.

9. A contact lens according to claim 1 wherein said annular mask region forms an annulus with a radial width of between approximately one-half and four millimeters.

10. A contact lens according to claim 1 wherein said annular mask region has a diameter of approximately four and one-half millimeters.

11. A contact lens according to claim 1 comprising means for selectively coloring said contact lens.

12. A contact lens according to claim 1 wherein said optical transmissivity is between approximately zero and ninety percent in the visible electromagnetic spectrum.

13. A contact lens according to claim 1 wherein said annular mask region comprises means forming a plurality of light-blocking dots arranged for selectively reducing the transmission of light energy through said annular mask region by between approximately ten and one hundred percent.

14. A contact lens according to claim 1 wherein said annular mask region is selectively translucent.

15. A contact lens according to claim 1 wherein said lens body includes means for restricting the motion of said lens body on the eye of the wearer to less than approximately one and one-half millimeter.

16. A contact lens according to claim 15 wherein said means for restricting the motion includes a prism ballast.

17. A contact lens according to claim 1 wherein said annular mask region has at least one artifact representing an area that transmits light energy through said lens body with a transmission similar to the transmission of light energy through said aperture.

18. A contact lens according to claim 17 wherein said artifact has geometrical optical structure arranged for improving the peripheral vision of the wearer.

19. A contact lens according to claim 17 wherein said mask region has a plurality of arc-shaped artifacts to equally spread diffractive light at the retina.

20. A contact lens according to claim 1 wherein said annular mask region is selectively patterned, colored or tinted for reducing the appearance of said annular mask region when viewed on the eye of the wearer.

21. A contact lens according to claim 1 wherein said annular mask region is selectively colored or tinted for matching, enhancing, or changing the appearance of the iris color of the wearer.

22. A method for manufacturing a contact lens, comprising the steps of
(A) forming a contact lens body with a first surface configured to substantially conform to the eye curvature of a wearer and with a second surface configured, in conjunction with said first surface, to correct the vision of the wearer selectively at a focus between and including near and far objects,
(B) providing on said lens body an annular mask region of selected optical transmissivity, wherein
  (i) said annular mask region forms a substantially pinhole-like optical aperture which transmits light energy through the pupil of the wearer,
  (ii) said annular mask region centers over the pupil of the wearer, and
  (iii) said annular mask region permits increasing light energy to pass through the pupil of the wearer during lower light conditions as the pupil dilates
wherein optical transmissivity of the the annular mask region varies such that the annular mask region transmits less light energy toward the pinhole aperture and transmits more light energy toward the outer edge of the contact lens.

23. A method according to claim 22 comprising the further step of providing an optical correction outside said annular mask region which selectively corrects the vision of the wearer at a focus between and including near and far objects, said second surface thereby forming a multi-powered surface.

24. A method according to claim 22 comprising the further step of providing an optical correction, such as with an aspheric, toric, convex or concave form, on said second surface.

25. A method according to claim 22 comprising the further step of providing an optical correction, such as with an aspheric, toric or concave form, on said first surface.

26. A method according to claim 22 comprising the further step of optimizing the size of the said annular mask region to fit the pupil size of the wearer.

27. A method according to claim 22 comprising the further step of providing additional mask to selectively block portions of the pupil of the wearer that contribute undesirable image effects.

28. A method according to claim 22 comprising the further step of weighting or shaping said lens body for maintaining a particular orientation on the eye of the wearer.

29. A method according to claim 22 comprising the further step of weighting or shaping said lens body for centering said aperture at the pupil of the wearer.

30. A method according to claim 22 comprising the further step of weighting or shaping said lens body for restricting the motion of said lens body on the eye of the wearer to less than approximately one and one-half millimeters.

31. A method according to claim 22 wherein the step of providing an annular mask region of selected optical transmissivity includes the step of providing light-blocking areas arranged for selectively reducing the transmission of light energy through said annular mask region by between approximately ten and one hundred percent.

32. A method according to claim 22 wherein said mask region the step of providing an annular mask region of selected optical transmissivity includes the step of providing variable transmission coatings such that light energy is selectively transmitted through said annular mask region by between approximately zero and ninety percent.

33. A method according to claim 22 wherein the step of forming a lens body includes the step of forming a lens body having a diameter between approximately seven and eighteen millimeters.

34. A method according to claim 22 wherein the step of providing an annular mask region includes the step of forming an aperture with a diameter of between approximately one-half and three millimeters.

35. A method according to claim 22 wherein the step of providing an annular mask region includes the step of forming an annulus with a radial width of between approximately one-half and four millimeters.

36. A method according to claim 22 comprising the further step of selectively coloring or tinted said contact lens.

37. A method according to claim 22 wherein the step of providing an annular mask region includes the step of providing a light-restricting element within said lens body.

38. A method according to claim 22 comprising the further step of configuring said first surface such that said lens body is restricted for movement on the eye of the wearer to less than approximately one and one-half millimeter.

39. A method according to claim 22 comprising the further step of forming light transmitting artifacts within said annular mask region, said artifacts representing area that transmits light energy through said lens body with a transmission similar to the transmission through said aperture.

40. A method according to claim 39 comprising the further step of arranging said artifacts in a geometrical optics configuration for improving the peripheral vision of the wearer.

41. A method according to claim 39 wherein said step of forming the artifacts comprises the additional step of arranging the artifacts in the annulus to equally spread diffractive light created by said artifacts at the cornea.

42. A method according to claim 22 comprising the further step of patterning, coloring, or tinting said annular mask region to reduce the appearance of said annular mask region when viewed on the eye of the wearer.

43. A non-surgical method for treating visual aberrations, said method comprising the steps of
   (A) fitting at least one eye of a wearer with a first contact lens configured to correct the vision of a wearer at a focus between and including near and far objects.
   (B) providing on said contact lens an annular mask region of selected optical transmissivity, wherein
      (i) said annular mask region forms a substantially pinhole-like optical aperture for the pupil of the wearer,
      (ii) said annular mask region centers over the pupil of the wearer, and
      (iii) said annular mask region permits increasing light energy to pass through the pupil of the wearer during lower lighting conditions as the pupil dilates
   wherein optical transmissivity of the the annular mask region varies such that the annular mask region transmits less light energy toward the pinhole aperture and transmits more light energy toward the outer edge of the contact lens.

44. A method according to claim 43 comprising the further step of fitting only one eye of the wearer with said first contact lens and fitting the other eye with a contact lens of selected power that is substantially free of an annular mask region.

* * * * *